United States Patent
Tanaka (10) Patent No.: US 6,684,113 B2
(45) Date of Patent: Jan. 27, 2004

(54) CONTROLLING DEVICE AND CONTROLLING METHOD

(75) Inventor: Masato Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/343,902

(22) PCT Filed: Aug. 6, 2001

(86) PCT No.: PCT/JP01/06733
§ 371 (c)(1),
(2), (4) Date: Feb. 3, 2003

(87) PCT Pub. No.: WO02/12968
PCT Pub. Date: Feb. 14, 2002

(65) Prior Publication Data
US 2003/0187521 A1 Oct. 2, 2003

(30) Foreign Application Priority Data
Aug. 4, 2000 (JP) ........................................ 2000-236684

(51) Int. Cl.$^7$ ............................................. G05B 13/02
(52) U.S. Cl. ........................... 700/40; 700/20; 700/42; 700/39; 700/71; 318/561; 318/610
(58) Field of Search ...................... 700/2–4, 20, 28–31, 700/40–43, 46, 71, 72, 75, 82, 44, 8, 38, 39; 318/685, 77, 561, 609, 610, 621; 703/2

(56) References Cited

U.S. PATENT DOCUMENTS

| | | | |
|---|---|---|---|
| 4,390,942 A | | 6/1983 | de Keizer ..................... 700/42 |
| 4,736,316 A | * | 4/1988 | Wallman ..................... 700/29 |
| 4,755,924 A | * | 7/1988 | Hiroi ........................... 700/54 |
| 5,184,292 A | * | 2/1993 | Schneider ..................... 700/42 |
| 5,331,541 A | * | 7/1994 | Ueda et al. ..................... 700/42 |
| 5,726,877 A | * | 3/1998 | Antoszkiewicz et al. ..... 700/41 |
| 6,081,751 A | * | 6/2000 | Luo et al. ..................... 700/42 |
| 6,571,135 B2 | * | 5/2003 | Bergold et al. ............... 700/42 |

FOREIGN PATENT DOCUMENTS

| | | | | |
|---|---|---|---|---|
| JP | 58-115504 A | | 7/1983 | ......... G05B/19/407 |
| JP | 60-134904 A | | 7/1985 | ............ G05B/11/32 |
| JP | 63075901 A | * | 4/1988 | ............ G05B/11/32 |

OTHER PUBLICATIONS

Middleton et al., "Performance Limitations in the Feedback Control of a Class of Resonant Systems", Dec. 1999, Proceedings of the 38th IEEE Conference on Decision & Control, vol. 2, pp. 1845–1850.*

* cited by examiner

Primary Examiner—Wilbert L. Starks, Jr.
Assistant Examiner—Crystal J. Barnes
(74) Attorney, Agent, or Firm—Blakely, Sokoloff, Taylor & Zafman (57) ABSTRACT

Controllers (PID1 to PIDn) perform control so that the controlled variables of first to n-th control loops may agree with their preset values. A step response progress calculating section (C_R1) calculates the progress α1 of the step response of the first control loop where the variation of the controlled variable is the slowest. Control loop internal preset value calculating sections (C_S2 to C_Sn) correct the preset values of the second to n-th control loops according to the progress α1 of the step response so that the controlled variables of the second to n-th control loops vary synchronously with the controlled variable of the first control loop and give the corrected preset values to the controllers (PID2 to PIDn).

4 Claims, 9 Drawing Sheets

CONTROLLING DEVICE AND CONTROLLING METHOD

The present patent application is a non-provisional application of International Application No. PCT/JP01/06733, filed Aug. 6, 2001.

TECHNICAL FIELD

The present invention relates to a controlling device having a plurality of controllers which perform control so that the controlled variables of a plurality of control loops agree with their preset values and, more particularly, to a controlling device and controlling method capable of realizing energy saving by reducing the settling standby times of controllers except the slowest control loop where the variation of the controlled variable is the slowest.

Apparatuses (e.g., a semiconductor manufacturing apparatus using an electric heater as an actuator) in which one device incorporates a plurality of loops of a control system have conventionally been known. In this apparatus, the controllers of the respective control loops are independently operated.

The controlled variables of the control loops do not always vary at the same speed. With a speed difference between variations in the controlled variables of the control loops, the responses of control loops except the slowest control loop exhibiting the slowest variation become faster than the response of the slowest control loop. While maintaining the settling state, the controllers of the control loops except the slowest control loop must wait until the response of the slowest control loop is completed. These controllers require a settling standby time during which the controllers stand by while maintaining the settling state upon the completion of the response. The controllers suffer an increase in energy consumption by the settling standby time.

DISCLOSURE OF INVENTION

The present invention has been made to overcome the conventional drawbacks, and has as its object to provide a controlling device and controlling method capable of realizing energy saving by reducing the settling standby times of controllers except the slowest control loop.

According to the present invention, there is provided a controlling device comprising a first controller (PID1) which performs control so as to make a controlled variable of a first control loop agree with a preset value, at least one remaining controller (PID2–PIDn) which performs control so as to make a controlled variable of at least one remaining control loop where variation of the controlled variable is higher than in the first control loop agree with a preset value, a step response progress calculating section (C_R1) which calculates a step response progress ($\alpha 1$) of the first control loop, and a control loop internal preset value calculating section (C_S2-C_Sn) which is arranged for each remaining controller, corrects the preset value of a corresponding remaining control loop on the basis of the step response progress so as to make the controlled variable of the corresponding remaining control loop vary synchronously with the controlled variable of the first control loop, and gives the corrected preset value to the remaining controller.

According to the present invention, there is provided a controlling device comprising a plurality of controllers (PID1–PIDn) which perform control so as to make controlled variables of a plurality of control loops agree with preset values, a plurality of step response progress calculating sections (C_R1a–C_Rna) which are arranged for the respective controllers and calculate step response progresses ($\alpha 1$–$\alpha n$) of the corresponding control loops, a slowest step response progress calculating section (C_Rm) which selects the slowest progress ($\alpha \min$) among the step response progresses calculated by the step response progress calculating sections, and control loop internal preset value calculating sections (C_S1a–C_Sna) which are arranged for the respective controllers, correct the preset values of the corresponding control loops on the basis of the slowest progress so as to make the controlled variables of the corresponding control loops vary synchronously with the slowest-progress controlled variable, and give the corrected preset values to the corresponding controllers.

According to the present invention, there is provided a controlling method in a controlling device having a plurality of controllers which perform control so as to make controlled variables of a plurality of control loops agree with preset values, comprising the steps of calculating a step response progress of a first control loop where variation of the controlled variable is the slowest, and correcting the preset values of the remaining control loops on the basis of the step response progress so as to make the controlled variables of the remaining control loops except the first control loop vary synchronously with the controlled variable of the first control loop, thereby giving the corrected preset values to the corresponding controllers.

According to the present invention, there is provided a controlling method comprising the steps of calculating step response progresses of the control loops, selecting the slowest progress among the calculated step response progresses, and correcting the preset values of the control loops on the basis of the slowest progress so as to make the controlled variables of the control loops vary synchronously with the slowest-progress controlled variable, thereby giving the corrected preset values to the controllers.

BEST MODE OF CARRYING OUT THE INVENTION

[First Embodiment]

Figure 1:
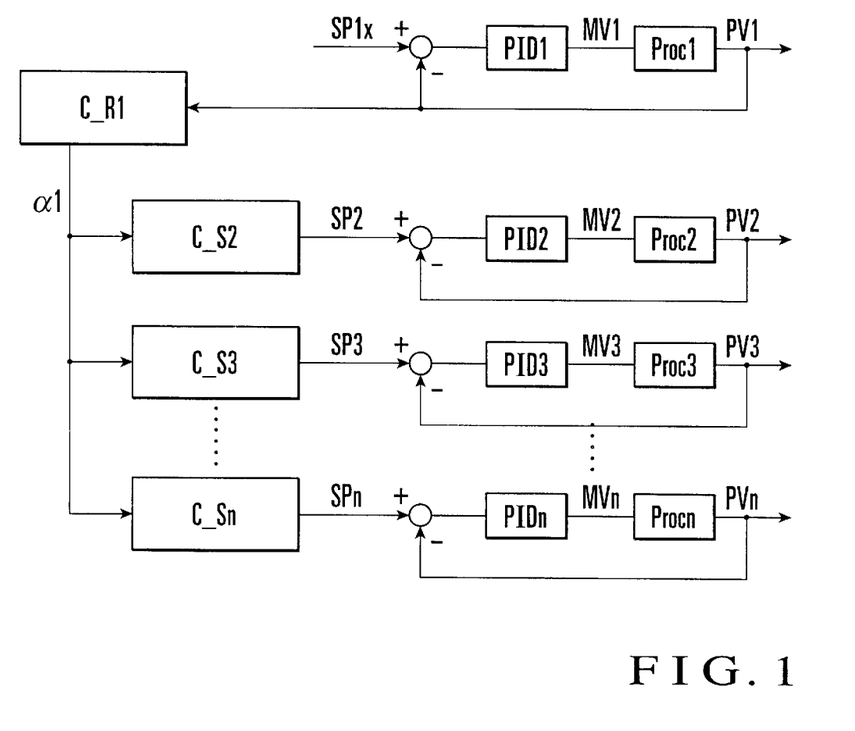
FIG. 1 is a block diagram showing the arrangement of a controlling device according to the first embodiment of the present invention.

Preferred embodiments of the present invention will be described in detail below. FIG. 1 is a block diagram showing the arrangement of a controlling device according to the first embodiment of the present invention. The controlling device in FIG. 1 comprises first to n-th controllers PID1 to PIDn which perform control so that the controlled variables of first to n-th (n is an integer of 2 or more) control loops agree with their preset values, a step response progress calculating section C_R1 which calculates the step response progress of the first control loop where the variation of the controlled variable is the slowest, and control loop internal preset value calculating sections C_S2 to C_Sn which are arranged for the controllers PID2 to PIDn except the first controller PID1 of the first control loop, correct the preset values of the second to n-th control loops on the basis of the step response progress so that the controlled variables of the second to n-th control loops vary synchronously with the controlled variable of the first control loop, and give the corrected preset values to the controllers PID2 to PIDn.

The first control loop is made up of the first controller PID1 and an object Proc1 to be controlled; the second control loop, the second controller PID2 and an object Proc2 to be controlled; the third control loop, the third controller PID3 and an object Pro3 to be controlled; and the n-th control loop, the n-th controller PIDn and an object Procn to be controlled The first embodiment can be applied to a plurality of loops when control loops operate as independent control systems in an apparatus (semiconductor manufacturing apparatus or the like) in which one device incorporates the loops of a plurality of control systems that simultaneously perform step response such as start-up, and when the times required up to the completion of the step response differ between the control loops. Especially, the first embodiment can be applied when a control loop (first control loop) where the variation of the controlled variable is the slowest is grasped in advance.

Figure 2:
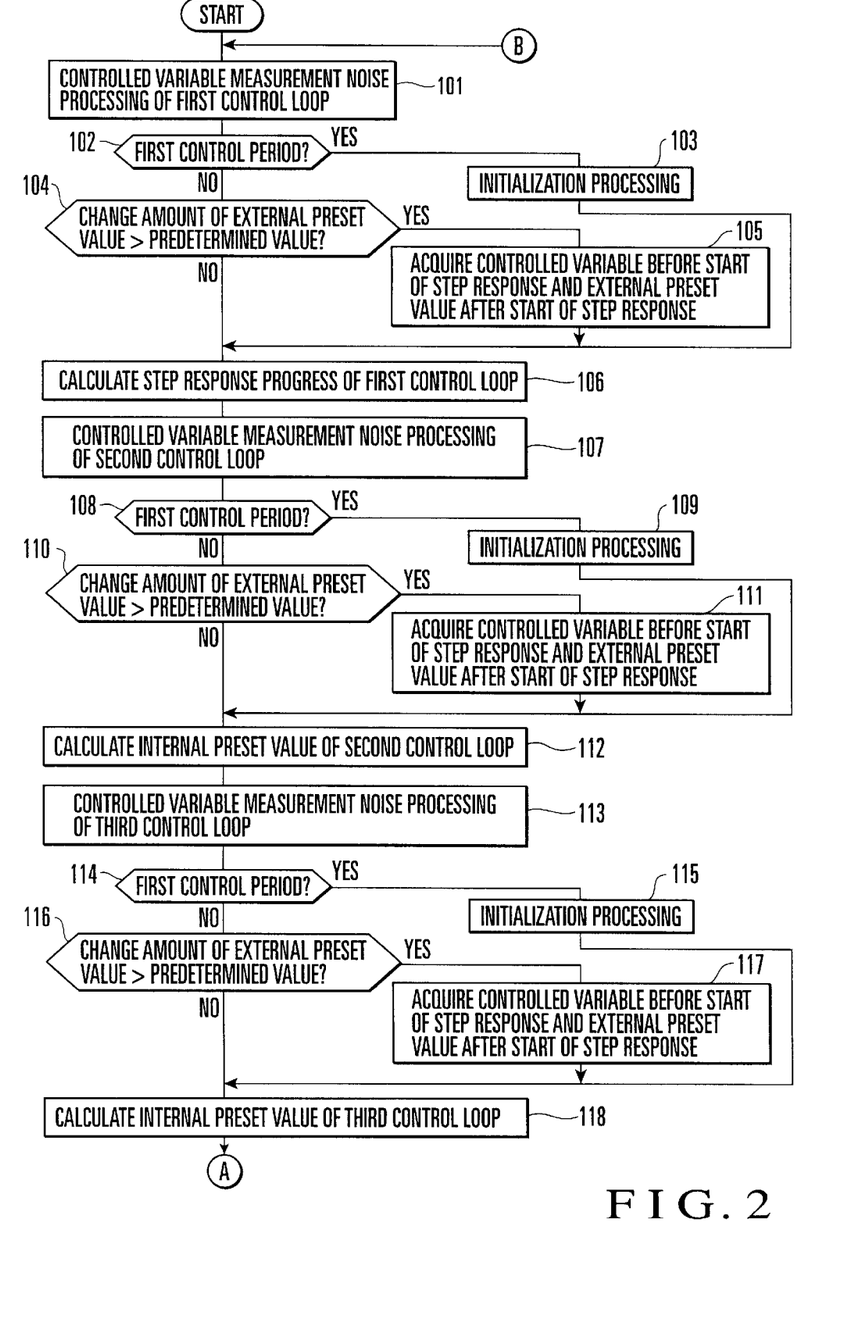
FIG. 2 is a flow chart for explaining the operation of the controlling device in FIG. 1.
Figure 3:
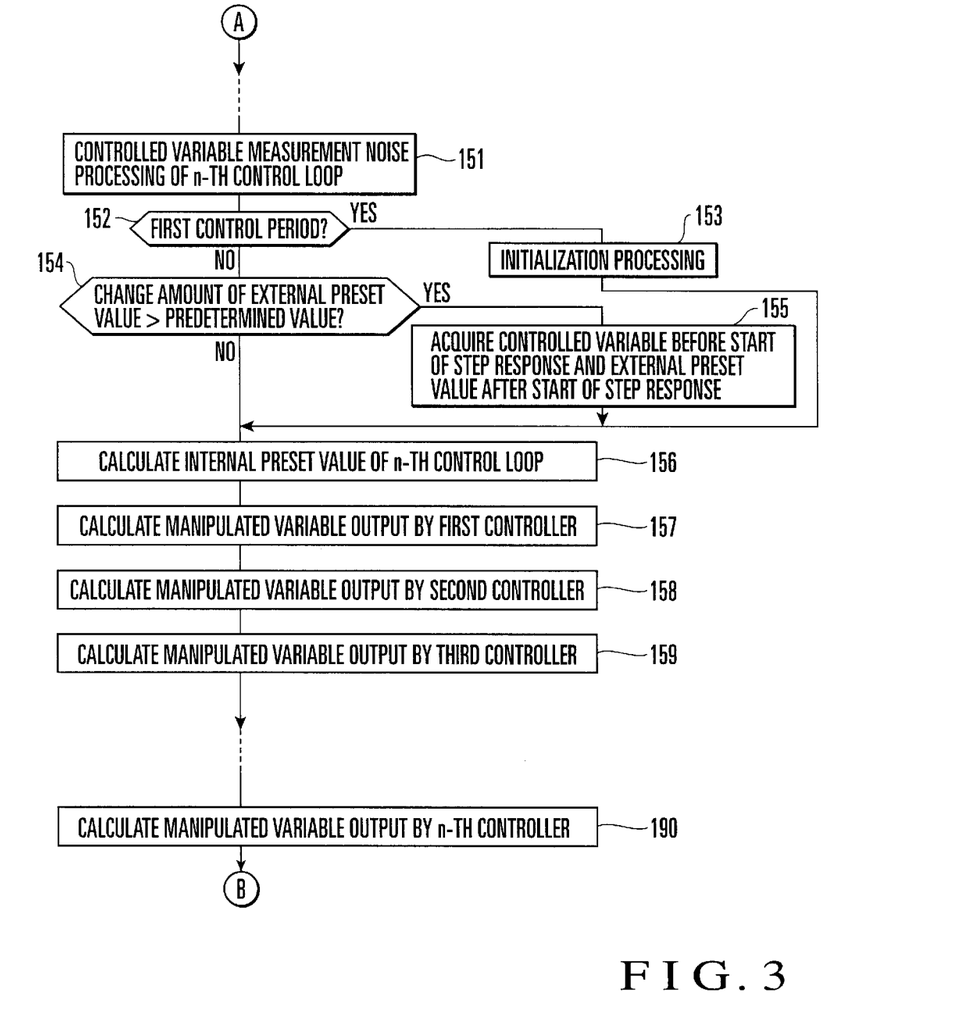
FIG. 3 is a flow chart for explaining the operation of the controlling device in FIG. 1.

The operation of the controlling device according to the first embodiment will be explained. FIGS. 2 and 3 are flow charts showing the operation of the controlling device in FIG. 1.

The step response progress calculating section C_R1 reduces the noise of a controlled variable PV1 by performing noise processing given by the following transfer function expression to the controlled variable PV1 of the object Proc1 of the first control loop that is measured by a sensor (not shown) (step 101):

$$PV1^* = \{1/(1+Tfs)\}PV1 \tag{1}$$

In equation (1), PV* is the controlled variable after noise processing, and Tf is the time constant of the noise filter. Noise processing corresponding to a low-pass filter can reduce the noise of the controlled variable PV1. An example of the noise of the controlled variable PV1 is measurement noise of the sensor (not shown) which measures the controlled variable PV1.

The step response progress calculating section C_R1 checks whether any one of external preset values SP1$x$, SP2$x$, SP3$x$, . . . , SPn$x$ set for the first, second, third, . . . , n-th control loops has greatly been changed from a corresponding one of predetermined values dSP1, dSP2, dSP3, . . . , dSPn designated in advance (step 104):

$$SPkx > SPkx' + dSPk (k=1, 2, 3, \ldots, n) \tag{2}$$

$$SPkx < SPkx' - dSPk (k=1, 2, 3, \ldots, n) \tag{3}$$

In inequalities (2) and (3), SPk$x$' is the external preset value of the k-th control loop before one control period.

If inequality (2) or (3) is established, i.e., if the external preset value SPk$x$ of the k-th (k=1, 2, 3, . . . , n) control loop during the current control period is larger than the sum of the external preset value SPk$x$' before one control period and a predetermined value dSPk, or if the external preset value SPk$x$ is smaller than the difference of the predetermined value dSPk from the external preset value SPk$x$' before one control period, the step response progress calculating section C_R1 determines that the change amount of the external preset value SPk$x$ is larger than the predetermined value dSPk. The step response progress calculating section C_R1 then sets the current control period as the start of the step response (YES in step 104).

If YES in step 104, the step response progress calculating section C_R1 sets the noise processing controlled variable PV1* of the first control loop during the current control period as a controlled variable PV1$a$ of the first control loop before the start of the step response, sets the external preset value SP1$x$ during the current control period as a preset value SP1$b$ of the first control loop after the start of the step response, and resets step response progress α1 of the first control loop to 0 (step 105). The controlled variable PV1* is set as the controlled variable PV1$a$ before the start of the step response because the controlled variable PV1* represents the response of the object Proc1 with respect to a manipulated variable output MV1 from the controller PID1 before the current control period.

In the first control period after the start of the operation, the step response progress calculating section C_R1 executes initialization processing without performing processes in steps 104 and 105 (steps 102 and 103). More specifically, the step response progress calculating section C_R1 sets the noise processing controlled variable PV1* during the current control period as the initial value of the controlled variable PV1$a$, sets the external preset value SP1$x$ during the current control period as the initial value of the preset value SP1$b$, and resets the step response progress α1 to 0.

The step response progress calculating section C_R1 calculates the step response progress α1 of the first control loop (step 106). The step response progress α1 is a real number of Δα to 1. As the step response progress α1 is closer to 1, the step response progresses more. Δα represents a step response progress correction amount (e.g., 0.05).

If the controlled variable PV1$a$ is equal to the preset value SP1$b$, the step response progress calculating section C_R1 sets the step response progress α1 to 1. If the controlled variable PV1$a$ is not equal to the preset value SP1$b$, the step response progress calculating section C_R1 calculates the step response progress a using the controlled variable PV1$a$, preset value SP1$b$, and noise processing controlled variable PV1*:

$$\alpha 1 = (PV1^* - PV1a)/(SP1b - PV1a) + \Delta\alpha \tag{4}$$

If the calculated step response progress a is smaller than the step response progress α1' before one control period, the step response progress calculating section C_R1 sets the step response progress α1' before one control period as the step response progress α1 during the current control period. If the calculated step response progress α1 is larger than 1, the step response progress calculating section C_R1 sets the step response progress α1 during the current control period to 1. Note that in the first control period, α1' is 0. Thus, the process in step 106 ends.

Noise processing is performed to the controlled variable PV1 in step 101 in order to accurately calculate the step response progress α1 in step 106. If the controlled variable PV1 contains a noise component, an error is generated in the calculation of the step response progress α1.

The second control loop internal preset value calculating section C_S2 reduces the noise of the controlled variable PV2 by performing noise processing given by the following transfer function expression to the controlled variable PV2 of the object Proc2 of the second control loop that is measured by the sensor (not shown) (step 107):

$$PV2^* = \{1/(1+Tfs)\}PV2 \quad (5)$$

In equation (5), PV2* is the controlled variable after noise processing.

The second control loop internal preset value calculating section C_S2 checks whether any one of the external preset values SP1x, SP2x, SP3x, . . . , SPnx set for the first, second, third, . . . , n-th control loops has greatly been changed from a corresponding one of the predetermined values dSP1, dSP2, dSP3, . . . , dSPn designated in advance (step 110).

If inequality (2) or (3) is established, the second control loop internal preset value calculating section C_S2 determines that the change amount of the external preset value SPkx (k=1, 2, 3, . . . , n) is larger than the predetermined value dSPk. The second control loop internal preset value calculating section C_S2 then sets the current control period as the start of the step response (YES in step 110).

If YES in step 110, the second control loop internal preset value calculating section C_S2 sets the noise processing controlled variable PV2* of the second control loop during the current control period as a controlled variable PV2a of the second control loop before the start of the step response, and sets the external preset value SP2x during the current control period as a preset value SP2b of the second control loop after the start of the step response (step 111).

In the first control period after the start of the operation, the second control loop internal preset value calculating section C_S2 executes initialization processing without performing processes in steps 110 and 111 (steps 108 and 109). More specifically, the second control loop internal preset value calculating section C_S2 sets the noise processing controlled variable PV2* during the current control period as the initial value of the controlled variable PV2a, sets the external preset value SP2x during the current control period as the initial value of the preset value SP2b, and sets the controlled variable PV2a as the initial value of an internal preset value SP2.

The second control loop internal preset value calculating section C_S2 calculates the internal preset value SP2 of the second control loop (step 112):

$$SP2 = (SP2'Tx + SP2^* dT)/(Tx + dT) \quad (6)$$

SP2' represents the internal preset value SP2 of the second control loop before one control period. In the first control period, the controlled variable PV2a is used as an initial value. Tx represents the shift time and is, e.g., Tx=2Tf to 5Tf, dT represents the control period, and SP2* represents the internal preset value reference of the second control loop and is given by $$SP2^* = (SP2b - PV2a)\alpha1 + PV2a \quad (7)$$

The process in step 112 ends. Noise processing is performed to the controlled variable PV2 in step 107 in order to accurately calculate the internal preset value SP2 in step 112.

The third control loop internal preset value calculating section C_S3 reduces the noise of the controlled variable PV3 by performing noise processing given by the following transfer function expression to the controlled variable PV3 of the object Proc3 of the third control loop that is measured by the sensor (not shown) (step 113):

$$PV3^* = \{1/(1+Tfs)\}PV3 \quad (8)$$

In equation (8), PV3* is the controlled variable after noise processing.

The third control loop internal preset value calculating section C_S3 checks whether inequality (2) or (3) is established (step 116). If inequality (2) or (3) is established and YES in step 116, the third control loop internal preset value calculating section C_S3 sets the noise processing controlled variable PV3* of the third control loop during the current control period as a controlled variable PV3a of the third control loop before the start of the step response, and sets the external preset value SP3x during the current control period as a preset value SP3b of the third control loop after the start of the step response (step 117).

In the first control period after the start of the operation, the third control loop internal preset value calculating section C_S3 executes initialization processing without performing processes in steps 116 and 117 (steps 114 and 115). More specifically, the third control loop internal preset value calculating section C_S3 sets the noise processing controlled variable PV3* during the current control period as the initial value of the controlled variable PV3a, sets the external preset value SP3x during the current control period as the initial value of the preset value SP3b, and sets the controlled variable PV3a as the initial value of an internal preset value SP3.

The third control loop internal preset value calculating section C_S3 calculates the internal preset value SP3 of the third control loop (step 118):

$$SP3 = (SP3'Tx + SP3^* dT)/(Tx + dT) \quad (9)$$

SP3' represents the internal preset value SP3 of the third control loop before one control period. In the first control period, the controlled variable PV3a is used as an initial value. SP3* represents the internal preset value reference of the third control loop and is given by $$SP3^* = (SP3b - PV3a)\alpha1 + PV3a \quad (10)$$

In this way, the same processes as in steps 107 to 112 or 113 to 118 are repeated. After the (n−1)-th control loop internal preset value calculating section C_Sn−1 (not shown) calculates an internal preset value SPn−1, the n-th control loop internal preset value calculating section C_Sn reduces the noise of the controlled variable PVn by performing noise processing given by the following transfer function expression to the controlled variable PVn of the object Procn of the n-th control loop that is measured by the sensor (not shown) (step 151):

$$PVn^* = \{1/(1+Tfs)\}PVn \quad (11)$$

In equation (11), PVn* is the controlled variable after noise processing.

The n-th control loop internal preset value calculating section C_Sn checks whether inequality (2) or (3) is established (step 154). If inequality (2) or (3) is established and YES in step 154, the n-th control loop internal preset value calculating section C_Sn sets the noise processing controlled variable PVn* of the n-th control loop during the current control period as a controlled variable PVna of the n-th control loop before the start of the step response, and sets the external preset value SPnx during the current control period as a preset value SPnb of the n-th control loop after the start of the step response (step 155).

In the first control period after the start of the operation, the n-th control loop internal preset value calculating section C_Sn executes initialization processing without performing processes in steps 154 and 155 (steps 152 and 153). More specifically, the n-th control loop internal preset value calculating section C_Sn sets the noise processing controlled variable PVn* during the current control period as the initial value of the controlled variable PVna, sets the external preset value SPnx during the current control period as the initial value of the preset value SPnb, and sets the controlled variable PVna as the initial value of an internal preset value SPn.

The n-th control loop internal preset value calculating section C_Sn calculates the internal preset value SPn of the n-th control loop (step 156):

$$SPn=(SPn'Tx+SPn*dT)/(Tx+dT) \quad (12)$$

SPn' represents the internal preset value SPn of the n-th control loop before one control period. In the first control period, the controlled variable PVna is used as an initial value. SPn* represents the internal preset value reference of the n-th control loop and is given by $$SPn*=(SPnb-PVna)\alpha1+PVna \quad (13)$$

The first controller PID1 calculates the manipulated variable output MV1 by executing a PID calculation given by a transfer function expression (step 157):

$$MV1=Kg1\{1+1/(Ti1s)+Td1s\}(SP1x-PV1) \quad (14)$$

In equation (14), Kg1, Ti1, and Td1 are the proportional gain, integral time, and derivative time of the controller PID1. The first controller PID1 outputs the calculated manipulated variable output MV1 to the object Proc1.

The second controller PID2 calculates a manipulated variable output MV2 by executing a PID calculation given by the following transfer function expression using the internal preset value SP2 output from the second control loop internal preset value calculating section C_S2 (step 158):

$$MV2=Kg2\{1+1/(Ti2s)+Td2s\}(SP2-PV2) \quad (15)$$

In equation (15), Kg2, Ti2, and Td2 are the proportional gain, integral time, and derivative time of the controller PID2. The second controller PID2 outputs the calculated manipulated variable output MV2 to the object Proc2.

The third controller PID3 calculates a manipulated variable output MV3 by executing the following PID calculation using the internal preset value SP3 output from the third control loop internal preset value calculating section C_S3 (step 159):

$$MV3=Kg3\{1+1/(Ti3s)+Td3s\}(SP3-PV3) \quad (16)$$

In equation (16), Kg3, Ti3, and Td3 are the proportional gain, integral time, and derivative time of the controller PID3. The third controller PID3 outputs the calculated manipulated variable output MV3 to the object Proc3.

Manipulated variable outputs are sequentially calculated in this fashion. After the (n−1)-th controller PIDn−1 (not shown) calculates a manipulated variable output MVn−1, the n-th controller PIDn calculates a manipulated variable output MVn by executing the following PID calculation using the internal preset value SPn output from the n-th control loop internal preset value calculating section C_Sn (step 190):

$$MVn=Kgn\{1+1/(Tins)+Tdns\}(SPn-PVn) \quad (17)$$

In equation (17), Kgn, Tin, and Tdn are the proportional gain, integral time, and derivative time of the controller PIDn. The n-th controller PIDn outputs the calculated manipulated variable output MVn to the object Procn.

Steps 101 to 190 are defined as processes in one control period, and the processes in steps 101 to 190 are repeated every control period.

In the first embodiment, the external preset values SP1x, SP2x, SP3x, . . . , SPnx are almost simultaneously changed by an external operation to a control system of two or more loops. After that, the step response progress α1 of the slowest-variation controlled variable (first control loop) grasped in advance is calculated by the step response progress calculating section C_R1. The calculation result is output to the internal preset value calculating sections C_S2 to C_Sn of the remaining control loops.

The internal preset value calculating sections C_S2 to C_Sn calculate the internal preset values SP2 to SPn corrected to suppress the step responses of the second to n-th control loops on the basis of the step response progress α1 so that the progresses of the controlled variables PV2 to PVn of the second to n-th control loops are synchronized with the slowest-variation controlled variable PV1 of the first control loop.

The controller PID1 of the slowest-variation first control loop calculates the manipulated variable output MV1 on the basis of the original external preset value SP1x set by the operator.

The controllers PID2 to PIDn of the second to n-th control loops calculate the manipulated variable outputs MV2 to MVn on the basis of the corrected internal preset values SP2 to SPn.

This arrangement can prevent the step responses of control loops except the slowest-variation first control loop from progressing much faster than the step response of the first control loop when the external preset values SP1x to SPnx of the first to n-th control loops are almost simultaneously changed. The controllers PID2 to PIDn except that of the first control loop can eliminate the settling standby time during which the controllers stand by while maintaining the settling state upon the completion of the step response.

When the controllers PID1 to PIDn control, e.g., heaters to perform temperature rise control, the controllers PID2 to PIDn in a conventional controlling device must stand by while maintaining the high-temperature settling state until at least the step response of the first control loop is completed, resulting in large energy consumption. To the contrary, in the controlling device of the first embodiment, the settling standby times of the controllers PID2 to PIDn can be eliminated, the energy consumption can be reduced, and energy saving can be realized.

Figure 4A:
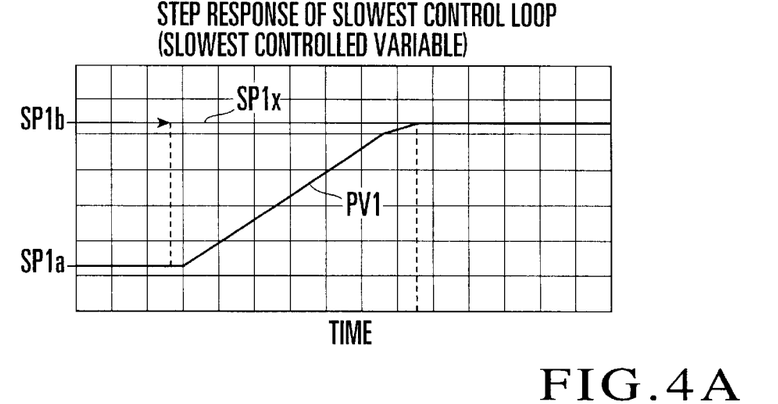
FIG. 4 shows views of an example of the control operation of a conventional controlling device.
Figure 4B:
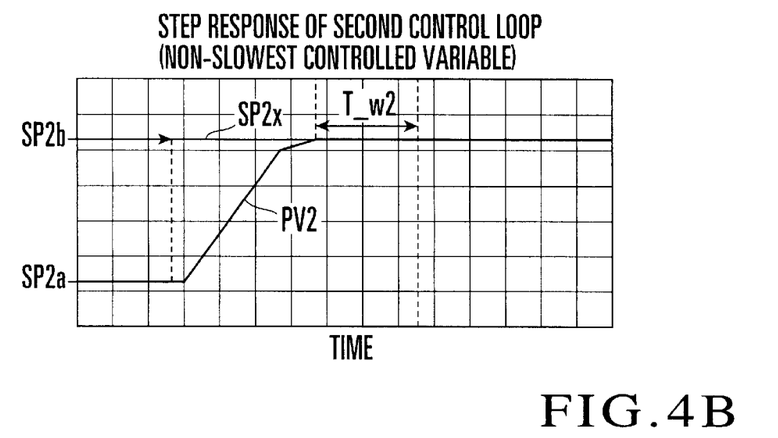
Figure 4C:
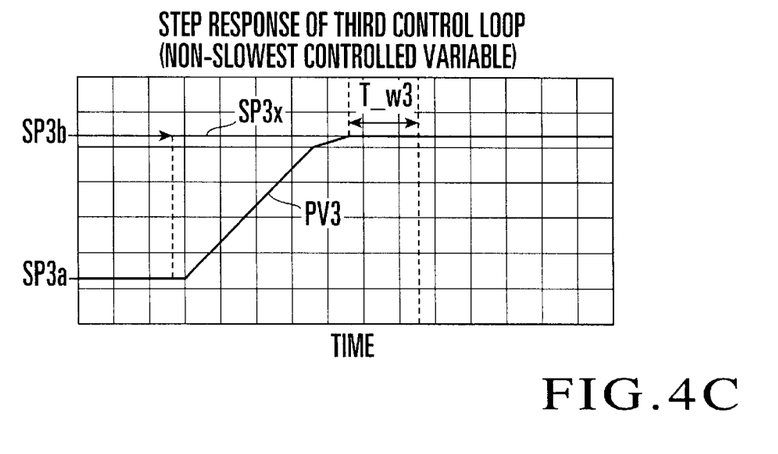
Figure 5A:
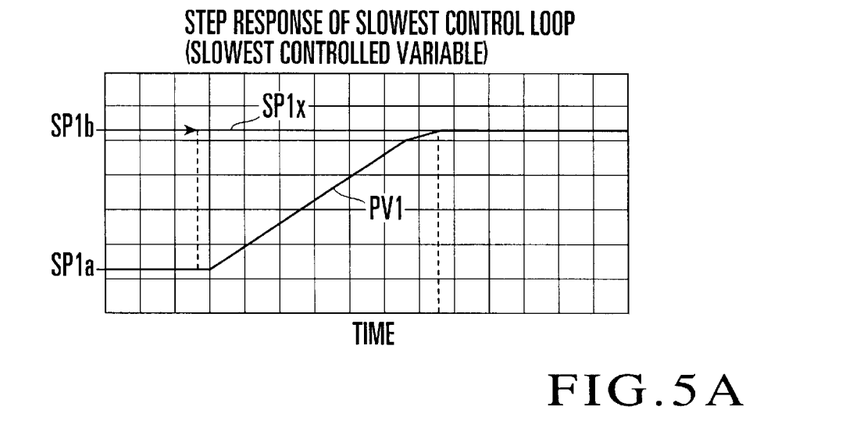
FIG. 5 shows views of an example of the control operation of the controlling device in FIG. 1.
Figure 5B:
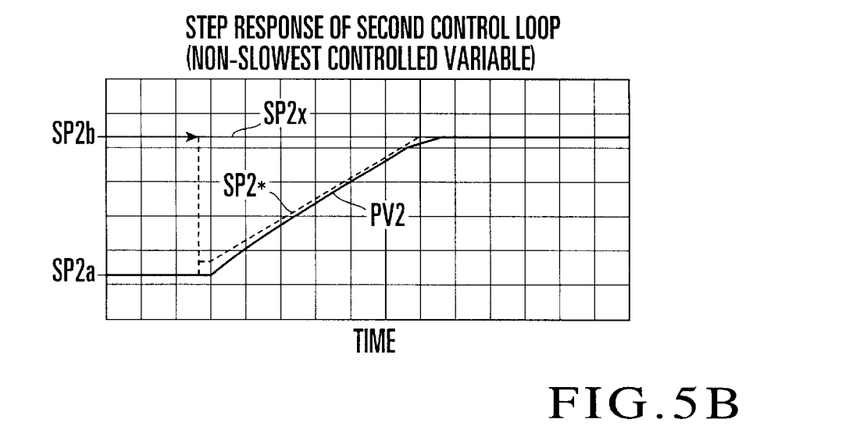
Figure 5C:
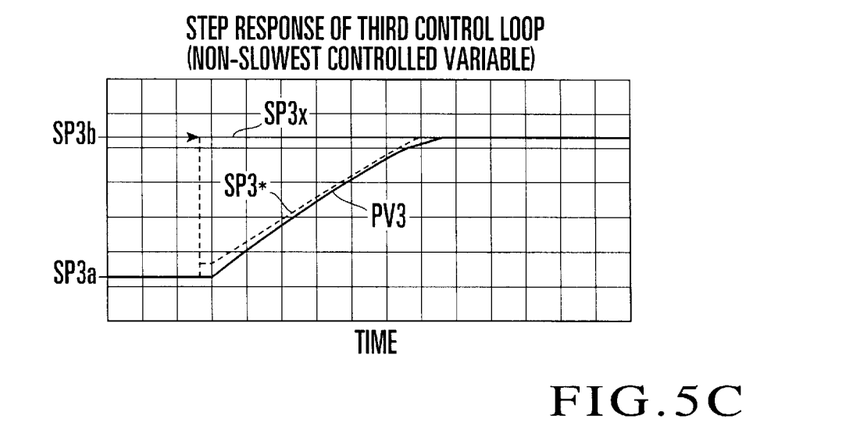

FIG. 4 shows views of an example of the control operation of a conventional controlling device in which the controllers PID1 to PIDn of the control loops are independently operated. FIG. 5 shows views of an example of the control operation of the controlling device according to the first embodiment. FIGS. 4 and 5 show the simulation results of calculating the controlled variables PV1, PV2, PV3, . . . , PVn when the external preset value SP1x of the first control loop is changed from SP1a to SP1b, the external preset value SP2x of the second control loop is changed from SP2a to SP2b, the external preset value SP3x of the third control loop is changed from SP3a to SP3b, and the external preset value SPnx of the n-th control loop is changed from SPna to SPnb. FIGS. 4 and 5 show only the first to third control loops. In the examples of FIGS. 4 and 5, the first control loop is a loop where the variation of the controlled variable is the slowest.

As shown in FIG. 4, in the conventional controlling device, the controlled variables PV2, PV3, . . . , PVn of the second, third, ..., n-th control loops reach SP2$b$, SP3$b$, ..., SP$nb$ before the controlled variable PV1 of the first control loop reaches the preset value SP1$b$. Settling standby times T_w2, T_w3, ..., T_wn are generated in the controllers PID2, PID3, ..., PIDn of the second, third, ..., n-th control loops.

In the first embodiment, as shown in FIG. 5, the controlled variables PV2, PV3, ..., PVn of the second, third, ..., n-th control loops are varied in synchronism with the variation of the controlled variable PV1 of the first control loop. Hence, no settling standby time is generated in the controllers PID2, PID3, ..., PIDn of the second, third, ..., n-th control loops.

[Second Embodiment]

Figure 6:
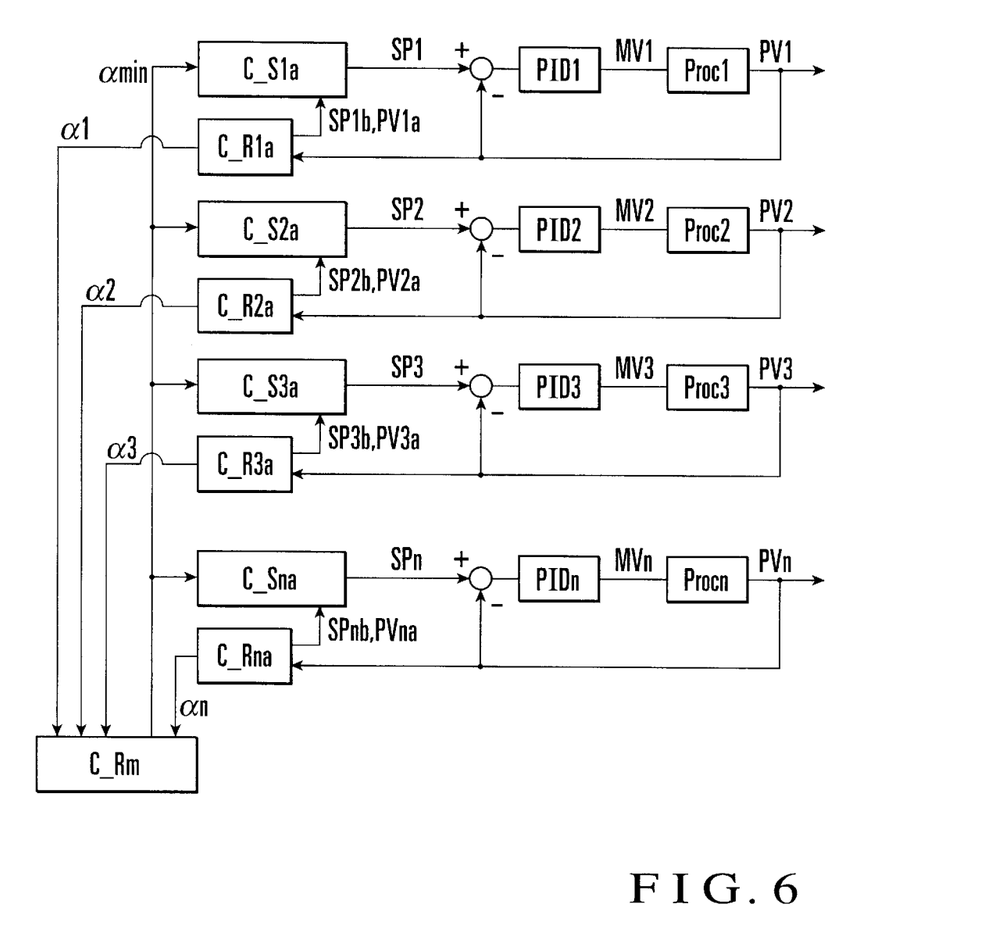
FIG. 6 is a block diagram showing the arrangement of a controlling device according to the second embodiment of the present invention.

FIG. 6 is a block diagram showing the arrangement of a controlling device according to the second embodiment of the present invention. The controlling device in FIG. 6 comprises first to n-th controllers PID1 to PIDn, step response progress calculating sections C_R1$a$ to C_Rn$a$ which are arranged for the controllers PID1 to PIDn and calculate the step response progresses of the first to n-th control loops, a slowest step response progress calculating section C_Rm which selects the slowest progress from the step response progresses calculated by the step response progress calculating sections C_R1$a$ to C_Rn$a$, and control loop internal preset value calculating sections C_S1$a$ to C_Sn$a$ which are arranged for the controllers PID1 to PIDn, correct the preset values of the first to n-th control loops on the basis of the slowest progress so that the controlled variables of the first to n-th control loops vary synchronously with the controlled variable for the slowest progress, and give the corrected preset values to the controllers PID1 to PIDn.

The first embodiment is applied to a case in which a control loop where the variation of the controlled variable is the slowest is grasped in advance. The second embodiment can be applied to a case in which a control loop where the variation of the controlled variable is the slowest is not grasped in advance.

Figure 7:
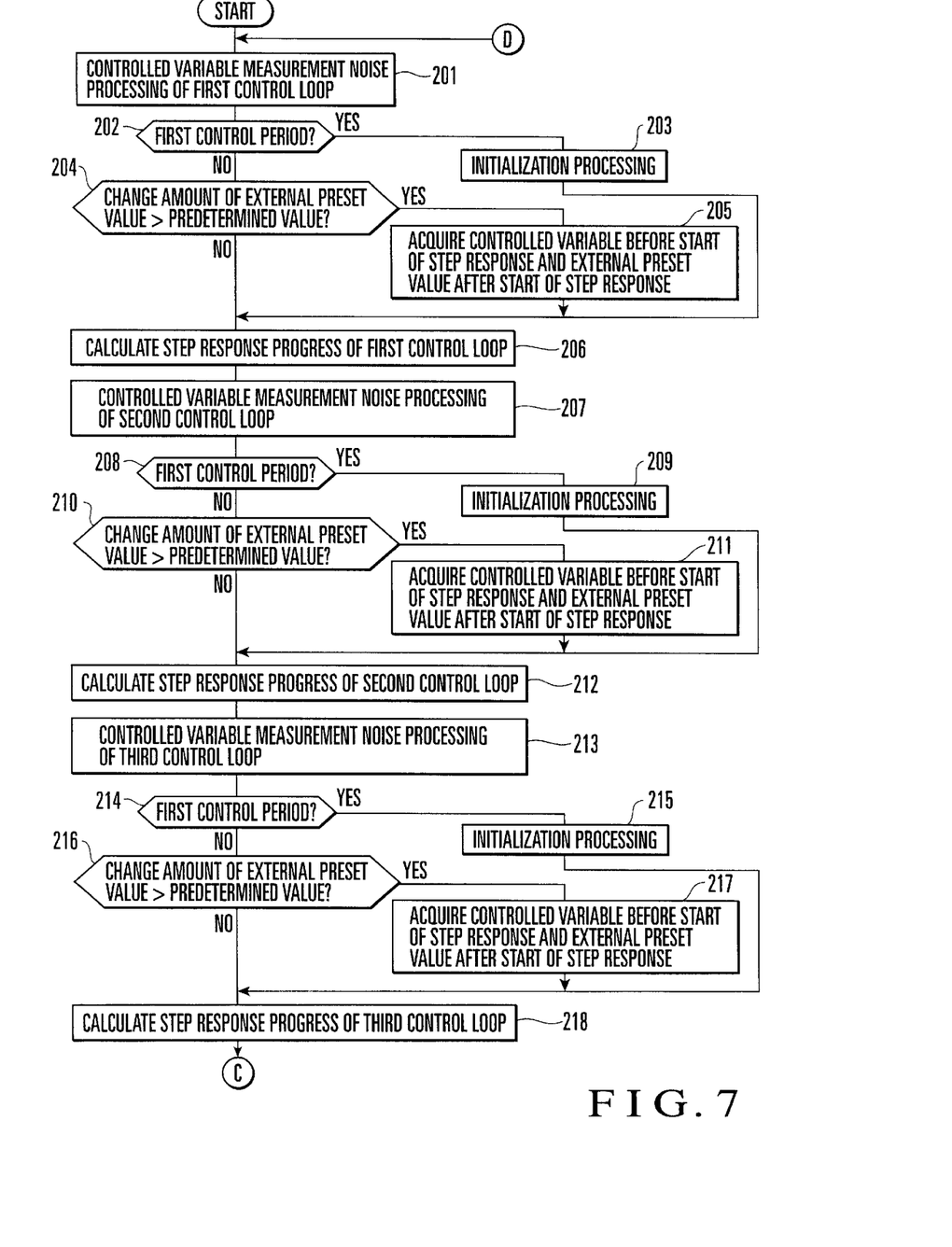
FIG. 7 is a flow chart for explaining the operation of the controlling device in FIG. 6.
Figure 8:
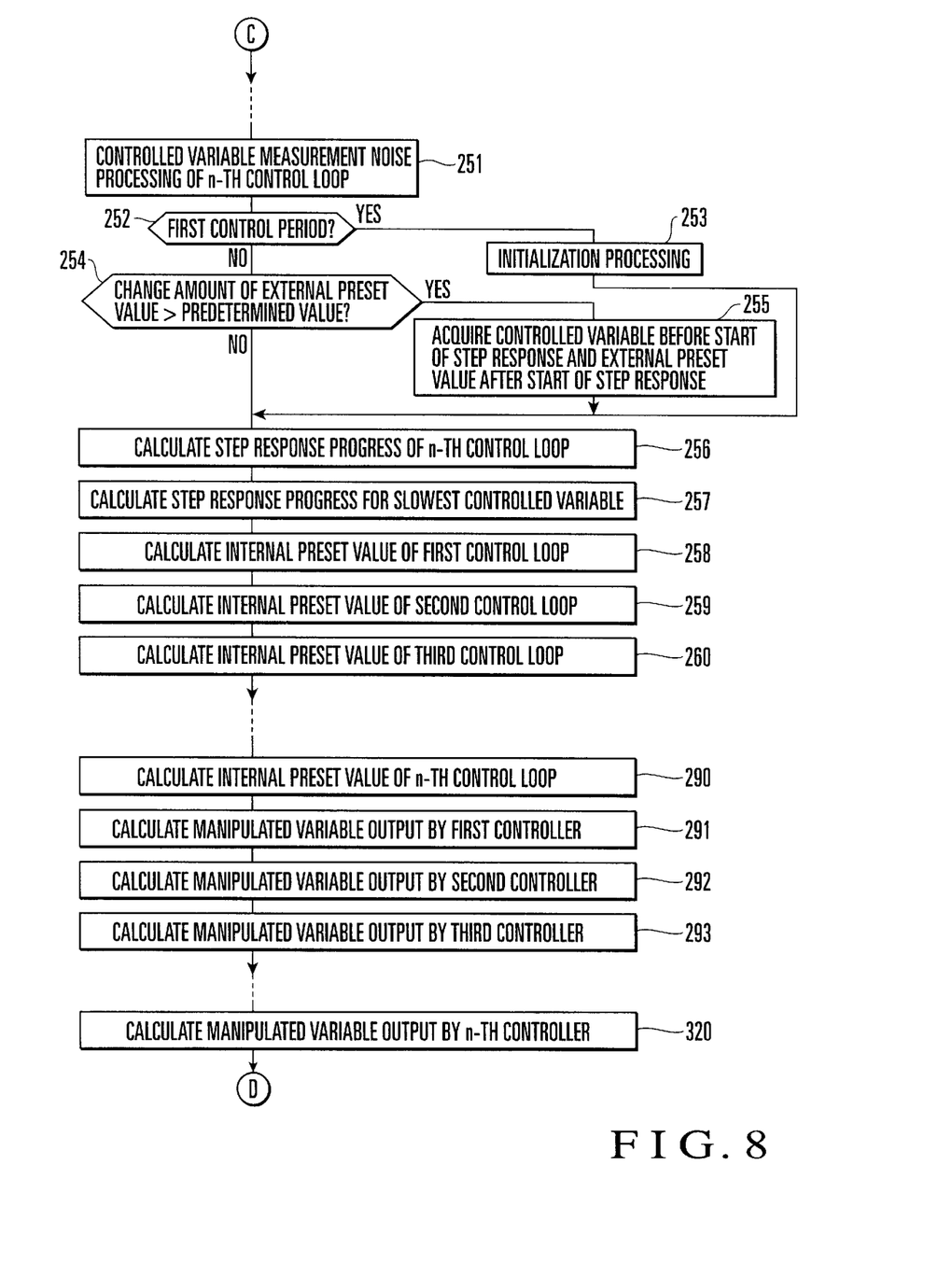
FIG. 8 is a flow chart for explaining the operation of the controlling device in FIG. 6.

The operation of the controlling device according to the second embodiment will be explained. FIGS. 7 and 8 are flow charts showing the operation of the controlling device in FIG. 6.

Processes in steps 201 to 206 by the first controlled variable step response progress calculating section C_R1$a$ are almost the same as processes in steps 101 to 106 by the first controlled variable step response progress calculating section C_R1 described in the first embodiment, and a detailed description thereof will be omitted. The second embodiment is different from the first embodiment in that the step response progress calculating section C_R1$a$ outputs the preset value SP1$b$ and controlled variable PV1$a$ to the first control loop internal preset value calculating section C_S1$a$.

The second controlled variable step response progress calculating section C_R2$a$ generates a noise processing controlled variable PV2* by performing noise processing given by the transfer function expression of equation (5) to the controlled variable PV2 of an object Proc2 of the second control loop that is measured by a sensor (not shown) (step 207).

The second controlled variable step response progress calculating section C_R2$a$ checks whether any one of the external preset values SP1$x$, SP2$x$, SP3$x$, ..., SP$nx$ set for the first, second, third, ..., n-th control loops has greatly been changed from a corresponding one of the predetermined values dSP1, dSP2, dSP3, ..., dSPn designated in advance (step 210).

If inequality (2) or (3) is established, the second controlled variable step response progress calculating section C_R2$a$ determines that the change amount of the external preset value SP$kx$ (k=1, 2, 3, ..., n) is larger than the predetermined value dSPk. The second controlled variable step response progress calculating section C_R2$a$ then sets the current control period as the start of the step response (YES in step 210).

If YES in step 210, the second controlled variable step response progress calculating section C_R2$a$ sets the noise processing controlled variable PV2* of the second control loop during the current control period as the controlled variable PV2$a$ of the second control loop before the start of the step response, sets the external preset value SP2$x$ during the current control period as the preset value SP2$b$ of the second control loop after the start of the step response, and resets the step response progress α2 of the second control loop to 0 (step 211).

In the first control period after the start of the operation, the second controlled variable step response progress calculating section C_R2$a$ executes initialization processing without performing processes in steps 210 and 211 (steps 208 and 209). More specifically, the second controlled variable step response progress calculating section C_R2$a$ sets the noise processing controlled variable PV2* during the current control period as the initial value of the controlled variable PV2$a$, sets the external preset value SP2$x$ during the current control period as the initial value of the preset value SP2$b$, and resets the step response progress α2 to 0.

The second controlled variable step response progress calculating section C_R2$a$ calculates the step response progress α2 of the second control loop (step 212). If the controlled variable PV2$a$ is equal to the preset value SP2$b$, the second controlled variable step response progress calculating section C_R2$a$ sets the step response progress α2 to 1. If the controlled variable PV2$a$ is not equal to the preset value SP2$b$, the second controlled variable step response progress calculating section C_R2$a$ calculates the step response progress α2 using the controlled variable PV2$a$, preset value SP2$b$, and noise processing controlled variable PV2*:

$$\alpha 2 = (PV2^* - PV2a)/(SP2b - PV2a) + \Delta\alpha \quad (18)$$

If the calculated step response progress α2 is smaller than the step response progress α2' before one control period, the second controlled variable step response progress calculating section C_R2$a$ sets the step response progress α2' before one control period as the step response progress α2 during the current control period. If the calculated step response progress α2 is larger than 1, the second controlled variable step response progress calculating section C_R2$a$ sets the step response progress α2 during the current control period to 1. Note that in the first control period, α2' is 0. Thus, the process in step 212 ends.

The third controlled variable step response progress calculating section C_R3$a$ generates a noise processing controlled variable PV3* by performing noise processing given by the transfer function expression of equation (8) to the controlled variable PV3 of an object Proc3 of the third control loop that is measured by the sensor (not shown) (step 213).

The third controlled variable step response progress calculating section C_R3$a$ checks whether any one of the external preset values SP1$x$, SP2$x$, SP3$x$, ..., SP$nx$ set for the first, second, third, ..., n-th control loops has been changed from a corresponding one of the predetermined values dSP1, dSP2, dSP3, . . . , dSPn designated in advance (step 216).

If inequality (2) or (3) is established, the third controlled variable step response progress calculating section C_R3a determines that the change amount of the external preset value SPkx (k=1, 2, 3, . . . , n) is larger than the predetermined value dSPk. The third controlled variable step response progress calculating section C_R3a then sets the current control period as the start of the step response (YES in step 216).

If YES in step 216, the third controlled variable step response progress calculating section C_R3a sets the noise processing controlled variable PV3* of the third control loop during the current control period as the controlled variable PV3a of the third control loop before the start of the step response, sets the external preset value SP3x during the current control period as the preset value SP3b of the third control loop after the start of the step response, and resets the step response progress α3 of the third control loop to 0 (step 217).

In the first control period after the start of the operation, the third controlled variable step response progress calculating section C_R3a executes initialization processing without performing processes in steps 216 and 217 (steps 214 and 215). More specifically, the third controlled variable step response progress calculating section C_R3a sets the noise processing controlled variable PV3* during the current control period as the initial value of the controlled variable PV3a, sets the external preset value SP3x during the current control period as the initial value of the preset value SP3b, and resets the step response progress α3 to 0.

The third controlled variable step response progress calculating section C_R3a calculates the step response progress α3 of the third control loop (step 218). If the controlled variable PV3a is equal to the preset value SP3b, the third controlled variable step response progress calculating section C_R3a sets the step response progress α3 to 1. If the controlled variable PV3a is not equal to the preset value SP3b, the third controlled variable step response progress calculating section C_R3a calculates the step response progress α3 using the controlled variable PV3a, preset value SP3b, and noise processing controlled variable PV3*:

$$\alpha 3=(PV3^*-PV3a)/(SP3b-PV3a)+\Delta\alpha \quad (19)$$

If the calculated step response progress α3 is smaller than the step response progress α3' before one control period, the third controlled variable step response progress calculating section C_R3a sets the step response progress α3' before one control period as the step response progress α3 during the current control period. If the calculated step response progress α3 is larger than 1, the third controlled variable step response progress calculating section C_R3a sets the step response progress α3 during the current control period to 1. Note that in the first control period, α3' is 0. Thus, the process in step 218 ends.

In this manner, the same processes as in steps 207 to 212 or 213 to 218 are repeated. After the (n−1)-th controlled variable step response progress calculating section C_Rn−1a (not shown) calculates the step response progress αn−1 of the (n−1)-th control loop, the n-th controlled variable step response progress calculating section C_Rna generates a noise processing controlled variable PVn* by performing noise processing given by the transfer function expression of equation (11) to the controlled variable PVn of an object Procn of the n-th control loop that is measured by the sensor (not shown) (step 251).

The n-th controlled variable step response progress calculating section C_Rna checks whether any one of the external preset values SP1x, SP2x, SP3x, . . . , SPnx set for the first, second, third, . . . , n-th control loops has greatly been changed from a corresponding one of the predetermined values dSP1, dSP2, dSP3, . . . , dSPn designated in advance (step 254).

If inequality (2) or (3) is established, the n-th controlled variable step response progress calculating section C_Rna determines that the change amount of the external preset value SPkx (k=1, 2, 3, . . . , n) is larger than the predetermined value dSPk. Then, the n-th controlled variable step response progress calculating section C_Rna sets the current control period as the start of the step response (YES in step 254).

If YES in step 254, the n-th controlled variable step response progress calculating section C_Rna sets the noise processing controlled variable PVn* of the n-th control loop during the current control period as the controlled variable PVna of the n-th control loop before the start of the step response, sets the external preset value SPnx during the current control period as the preset value SPnb of the n-th control loop after the start of the step response, and resets the step response progress αn of the n-th control loop to 0 (step 255).

In the first control period after the start of the operation, the n-th controlled variable step response progress calculating section C_Rna executes initialization processing without performing processes in steps 254 and 255 (steps 252 and 253). More specifically, the n-th controlled variable step response progress calculating section C_Rna sets the noise processing controlled variable PVn* during the current control period as the initial value of the controlled variable PVna, sets the external preset value SPnx during the current control period as the initial value of the preset value SPnb, and resets the step response progress αn to 0.

The n-th controlled variable step response progress calculating section C_Rna calculates the step response progress αn of the n-th control loop (step 256). If the controlled variable PVna is equal to the preset value SPnb, the n-th controlled variable step response progress calculating section C_Rna sets the step response progress αn to 1. If the controlled variable PVna is not equal to the preset value SPnb, the n-th controlled variable step response progress calculating section C_Rna calculates the step response progress αn using the controlled variable PVna, preset value SPnb, and noise processing controlled variable PVn*:

$$\alpha n=(PVn^*-PVna)/(SPnb-PVna)+\Delta\alpha \quad (20)$$

If the calculated step response progress αn is smaller than the step response progress αn' before one control period, the n-th controlled variable step response progress calculating section C_Rna sets the step response progress αn' before one control period as the step response progress αn during the current control period. If the calculated step response progress αn is larger than 1, the n-th controlled variable step response progress calculating section C_Rna sets the step response progress αn during the current control period to 1. Note that in the first control period, αn' is 0. Thus, the process in step 256 ends.

Thereafter, the slowest step response progress calculating section C_Rm calculates the minimum value (slowest controlled variable step response progress) αmin from the step response progresses α1, α2, α3, . . . , αn of all the first, second, third, . . . , n-th control loops, and outputs the minimum value αmin to the internal preset value calculating sections C_S1a to C_Sna (step 257).

More specifically, if the step response progress α1 is smaller than the step response progress α2, the slowest step response progress calculating section C_Rm sets α1 as the minimum value αmin, or if α1 is equal to or larger than α2, α2 as the minimum value αmin. If the step response progress α3 is smaller than the minimum value αmin, the slowest step response progress calculating section C_Rm sets α3 as the minimum value αmin. Similarly, the slowest step response progress calculating section C_Rm repeats the comparison between the minimum value αmin and each step response progress up to αn, thereby defining the minimum value αmin.

The first control loop internal preset value calculating section C_S1a calculates the internal preset value SP1 of the first control loop (step 258):

$$SP1=(SP1'Tx+SP1*dT)/(Tx+dT) \quad (21)$$

SP1' represents the internal preset value SP1 of the first control loop before one control period. In the first control period, the controlled variable PV1a is used as an initial value. SP1* represents the internal preset value reference of the first control loop and is given by $$SP1*=(SP1b-PV1a)\alpha min+PV1a \quad (22)$$

The second control loop internal preset value calculating section C_S2a calculates the internal preset value SP2 of the second control loop (step 259):

$$SP2=(SP2'Tx+SP2*dT)/(Tx+dT) \quad (23)$$

SP2' represents the internal preset value SP2 of the second control loop before one control period. In the first control period, the controlled variable PV2a is used as an initial value. SP2* represents the internal preset value reference of the second control loop and is given by $$SP2*=(SP2b-PV2a)\alpha min+PV2a \quad (24)$$

The third control loop internal preset value calculating section C_S3a calculates the internal preset value SP3 of the third control loop (step 260):

$$SP3=(SP3'Tx+SP3*dT)/(Tx+dT) \quad (25)$$

SP3' represents the internal preset value SP3 of the third control loop before one control period. In the first control period, the controlled variable PV3a is used as an initial value. SP3* represents the internal preset value reference of the third control loop and is given by $$SP3*=(SP3b-PV3a)\alpha min+PV3a \quad (26)$$

Internal preset values are similarly calculated. After the (n−1)th control loop internal preset value calculating section C_Sn−1a calculates the internal preset value SPn−1 of the (n−1)th control loop, the n-th control loop internal preset value calculating section C_Sna calculates the internal preset value SPn of the n-th control loop (step 290):

$$SPn=(SPn'Tx+SPn*dT)/(Tx+dT) \quad (27)$$

SPn' represents the internal preset value SPn of the n-th control loop before one control period. In the first control period, the controlled variable PVna is used as an initial value. SPn* represents the internal preset value reference of the n-th control loop and is given by $$SPn*=(SPnb-PVna)\alpha min+PVna \quad (28)$$

Then, the first controller PID1 calculates the manipulated variable output MV1 by executing a PID calculation given by the following transfer function expression using the internal preset value SP1 output from the first control loop internal preset value calculating section C_S1a (step 291):

$$MV1=Kg1\{1+1/(Ti1s)+Td1s\}(SP1-PV1) \quad (29)$$

In equation (29), Kg1, Ti1, and Td1 are the proportional gain, integral time, and derivative time of the controller PID1. The first controller PID1 outputs the calculated manipulated variable output MV1 to the object Proc1.

The second controller PID2 calculates the manipulated variable output MV2 by executing a PID calculation as given by equation (15) using the internal preset value SP2 output from the second control loop internal preset value calculating section C_S2a (step 292). The second controller PID2 outputs the calculated manipulated variable output MV2 to the object Proc2.

The third controller PID3 calculates the manipulated variable output MV3 by executing a PID calculation as given by equation (16) using the internal preset value SP3 output from the third control loop internal preset value calculating section C_S3a (step 293). The third controller PID3 outputs the calculated manipulated variable output MV3 to the object Proc3.

Manipulated variable outputs are sequentially calculated in this way. After the (n−1)-th controller PIDn−1 (not shown) calculates the manipulated variable output MVn−1, the n-th controller PIDn calculates the manipulated variable output MVn by executing a PID calculation as given by equation (17) using the internal preset value SPn output from the n-th control loop internal preset value calculating section C_Sna (step 320). The n-th controller PIDn outputs the calculated manipulated variable output MVn to the object Procn.

Steps 201 to 320 are defined as processes in one control period, and the processes in steps 201 to 320 are repeated every control period.

In the second embodiment, the external preset values SP1x, SP2x, SP3x, . . . , SPnx are almost simultaneously changed by an external operation to a control system of two or more loops. After that, the step response progresses α1 to αn of the respective control loops are calculated by the step response progress calculating sections C_R1a to C_Rna. The calculation results are output to the slowest step response progress calculating section C_Rm.

The slowest step response progress calculating section C_Rm calculates the minimum value, i.e., the slowest step response progress αmin among the step response progresses α1 to αn of the respective control loops, and outputs the slowest progress αmin to the control loop internal preset value calculating sections C_S1a to C_Sna.

The internal preset value calculating sections C_S1a to C_Sna calculate the internal preset values SP1 to SPn corrected to suppress the step responses of the first to n-th control loops on the basis of the slowest progress αmin so that the progresses of the controlled variables PV1 to PVn of the first to n-th control loops are synchronized with the slowest-variation controlled variable of the control loop. At this time, the same processing is done to the slowest control loop so as not to influence the response speed of the slowest control loop. The controllers PID1 to PIDn of the first to n-th control loops calculate the manipulated variable outputs MV1 to MVn on the basis of the corrected internal preset values SP1 to SPn.

This arrangement can prevent the step responses of control loops except the slowest-variation control loop from progressing much faster than the step response of the slowest control loop when the external preset values SP1x to SPnx of the first to n-th control loops are almost simultaneously changed. The controllers except that of the slowest control loop can eliminate the settling standby time, realizing energy saving. Especially in the second embodiment, the slowest control loop where the variation of the controlled variable is the slowest need not be grasped in advance. Even when the step response speed changes depending on the situation and the slowest control loop changes, the control loops can be properly operated.

Figure 9A:
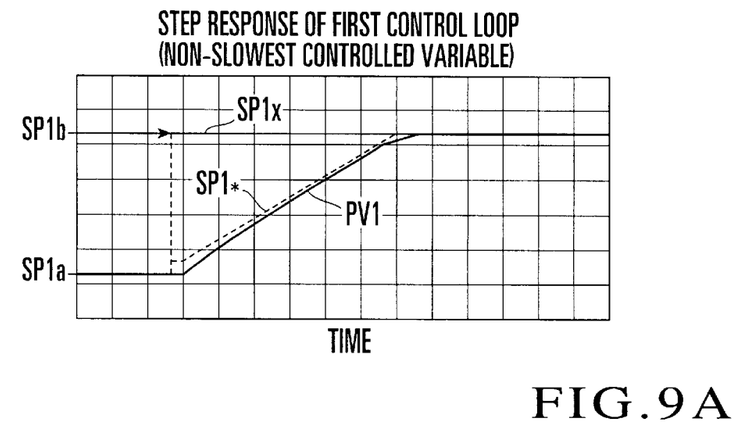
FIG. 9 shows views of an example of the control operation of the controlling device in FIG. 6.
Figure 9B:
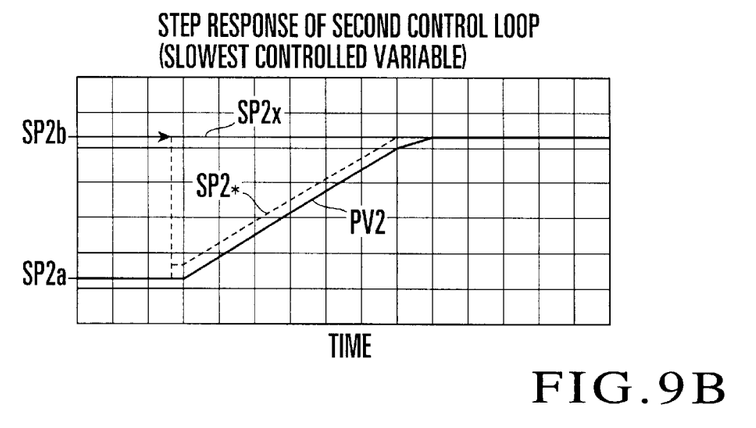
Figure 9C:
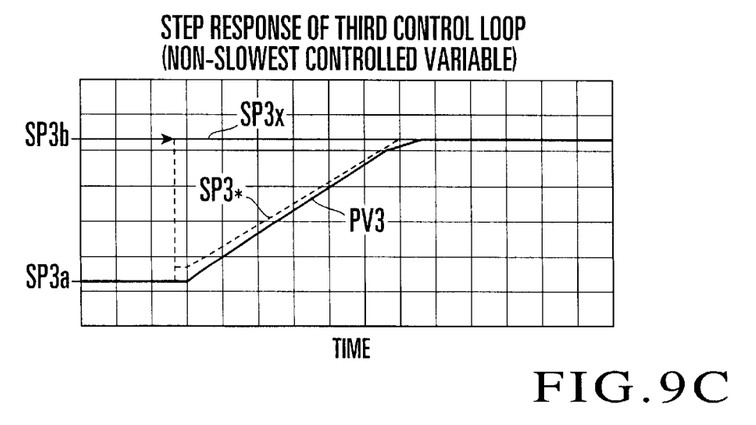

FIG. 9 shows views of an example of the control operation of the controlling device according to the second embodiment. FIG. 9 shows the simulation results of calculating the controlled variables PV1, PV2, PV3, . . . , PVn when the external preset value SP1x of the first control loop is changed from SP1a to SP1b, the external preset value SP2x of the second control loop is changed from SP2a to SP2b, the external preset value SP3x of the third control loop is changed from SP3a to SP3b, and the external preset value SPnx of the n-th control loop is changed from SPna to SPnb. FIG. 9 shows only the first to third control loops. In the example of FIG. 9, the second control loop is a loop where the variation of the controlled variable is the slowest.

As is apparent from FIG. 9, when the second embodiment is applied, the controlled variables PV1, PV3, . . . , PVn of the first, third, . . . , n-th control loops are varied in synchronism with the variation of the controlled variable PV2 of the second control loop where the variation of the controlled variable is the slowest. No settling standby time is generated in the controllers PID1, PID3, . . . , PIDn of the first, third, . . . , n-th control loops.

The first and second embodiments have exemplified n≧4, but the present invention can be applied for n≧2.

In the first and second embodiments, all the external preset values are simultaneously changed. However, the present invention is not limited to this, and the effects of the first embodiment can be obtained even when the external preset values of two or more loops including the slowest loop among n loops are changed with a slight timing shift. In addition, the effects of the second embodiment can be obtained even when the external preset values of two or more arbitrary loops among n loops are changed with a slight timing shift.

As has been described above, the present invention is suitable for a device having a plurality of loops of the control system within one apparatus.

What is claimed is:

1. A controlling device characterized by comprising:
a first controller which performs control so as to make a controlled variable of a first control loop agree with a preset value;
at least one remaining controller which performs control so as to make a controlled variable of at least one remaining control loop where variation of the controlled variable is higher than in the first control loop agree with a preset value;
a step response progress calculating section which calculates a step response progress of the first control loop; and
a control loop internal preset value calculating section which is arranged for each remaining controller, corrects the preset value of a corresponding remaining control loop on the basis of the step response progress so as to make the controlled variable of said corresponding remaining control loop vary synchronously with the controlled variable of the first control loop, and gives the corrected preset value to said remaining controller.

2. A controlling device characterized by comprising:
a plurality of controllers which perform control so as to make controlled variables of a plurality of control loops agree with preset values;
a plurality of step response progress calculating sections which are arranged for said respective controllers and calculate step response progresses of the corresponding control loops;
a slowest step response progress calculating section which selects the slowest progress among the step response progresses calculated by said step response progress calculating sections; and
control loop internal preset value calculating sections which are arranged for said respective controllers, correct the preset values of the corresponding control loops on the basis of the slowest progress so as to make the controlled variables of the corresponding control loops vary synchronously with the slowest-progress controlled variable, and give the corrected preset values to said corresponding controllers.

3. A controlling method in a controlling device having a plurality of controllers which perform control so as to make controlled variables of a plurality of control loops agree with preset values, characterized by comprising the steps of:
calculating a step response progress of a first control loop where variation of the controlled variable is the slowest; and
correcting the preset values of the remaining control loops on the basis of the step response progress so as to make the controlled variables of the remaining control loops except the first control loop vary synchronously with the controlled variable of the first control loop, thereby giving the corrected preset values to the corresponding controllers.

4. A controlling method in a controlling device having a plurality of controllers which perform control so as to make controlled variables of a plurality of control loops agree with preset values, characterized by comprising the steps of:
calculating step response progresses of the control loops;
selecting the slowest progress among the calculated step response progresses; and
correcting the preset values of the control loops on the basis of the slowest progress so as to make the controlled variables of the control loops vary synchronously with the slowest-progress controlled variable, thereby giving the corrected preset values to the controllers.

* * * * *